July 25, 1944.  W. C. EDDY  2,354,583
SYNCHRONIZING SYSTEM
Filed Nov. 30, 1940  2 Sheets-Sheet 1
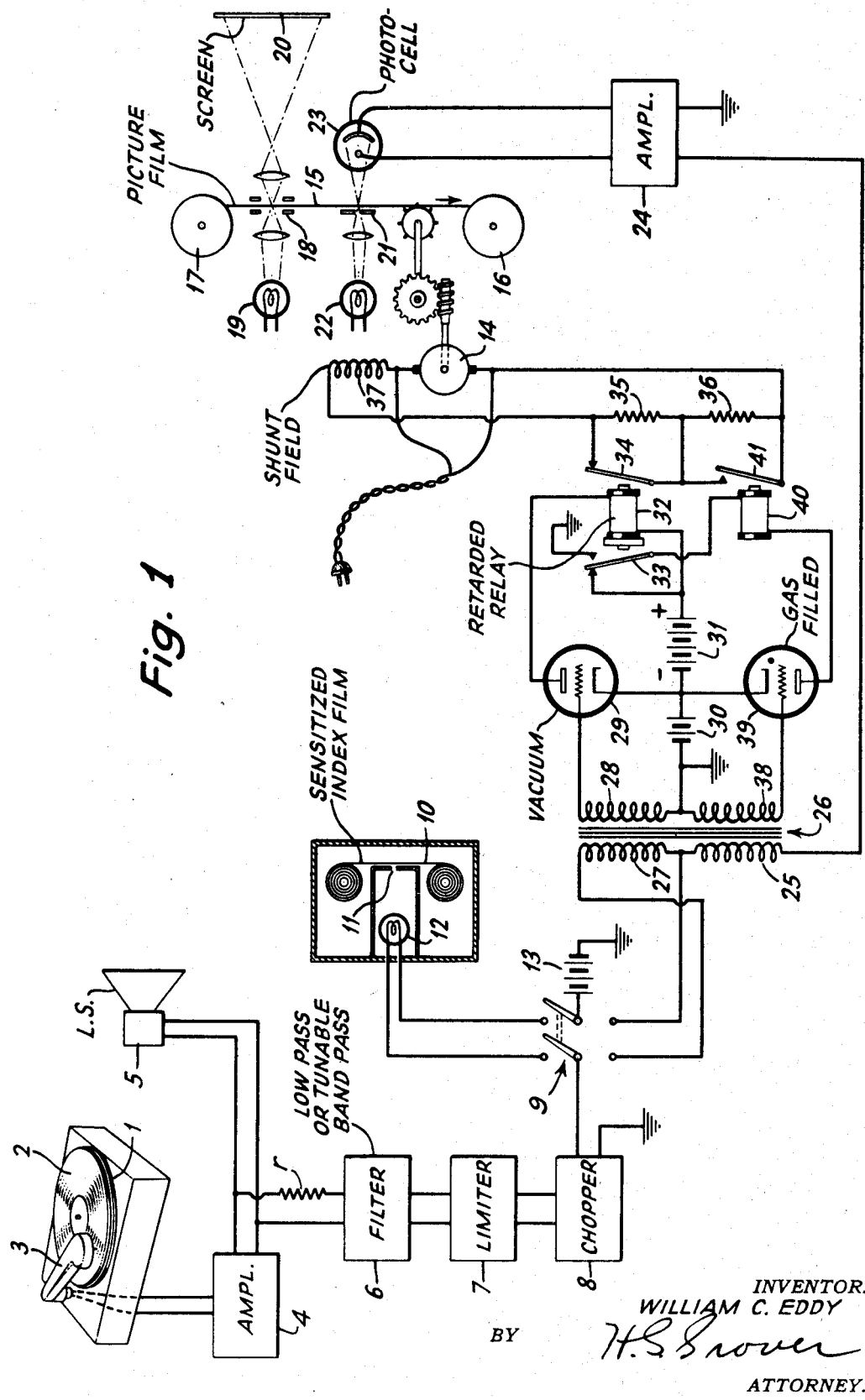

July 25, 1944.   W. C. EDDY   2,354,583
SYNCHRONIZING SYSTEM
Filed Nov. 30, 1940   2 Sheets-Sheet 2
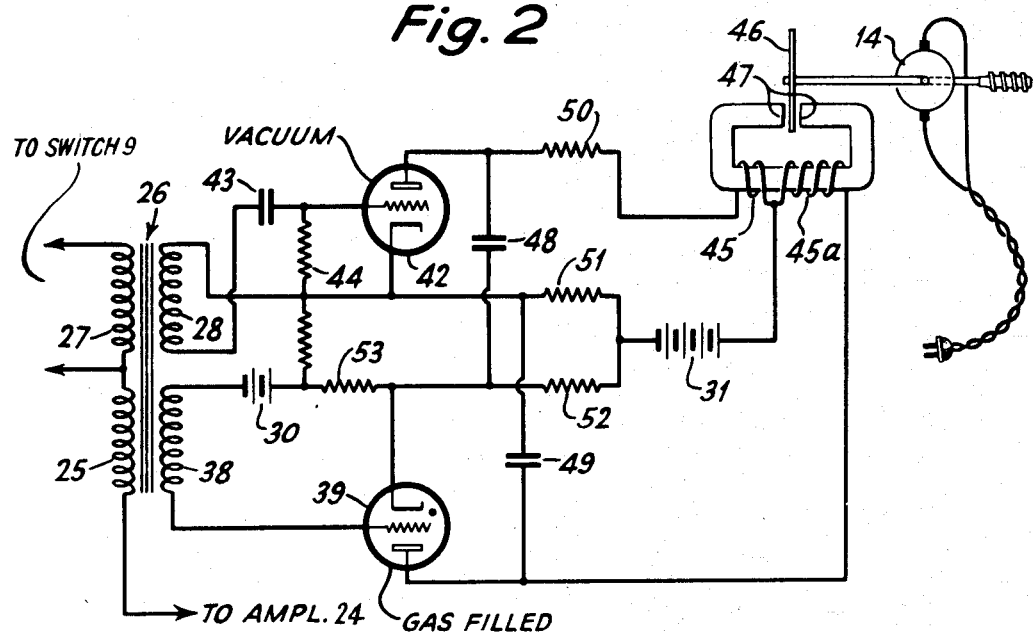
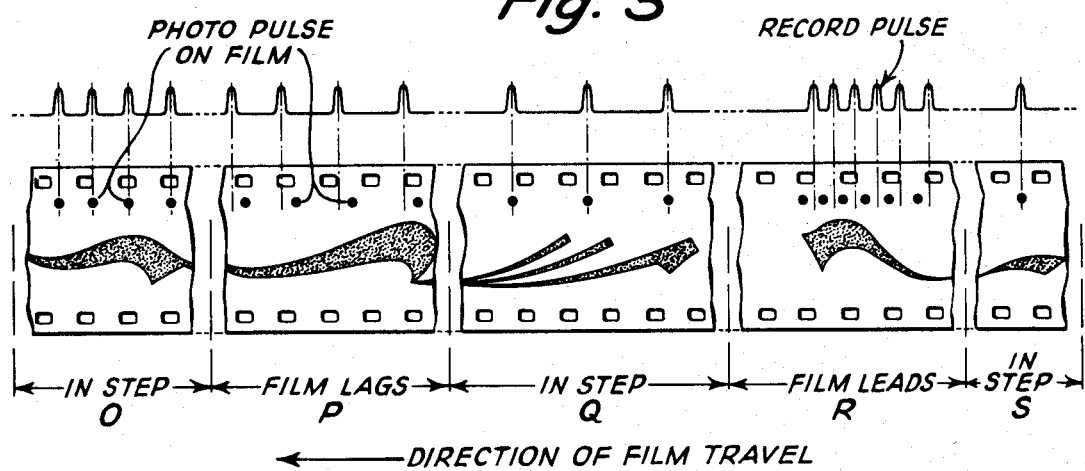
INVENTOR.
WILLIAM C. EDDY
BY
ATTORNEY.

Patented July 25, 1944

2,354,583

UNITED STATES PATENT OFFICE 2,354,583

SYNCHRONIZING SYSTEM

William C. Eddy, Chicago, Ill., assignor to Radio Corporation of America, a corporation of Delaware Application November 30, 1940, Serial No. 368,099

16 Claims. (Cl. 88—16.2)

This invention relates to a system and a method for synchronizing a motion picture film with a sound record made on another medium, such as a phonograph disc or sound film.

In the making of sound picture films it is frequently the case that the original sound records and the picture records are first recorded on separate media. If the sound record is to be used as an appropriate accompaniment to the picture, or vice versa, then it is essential that the motor which drives the picture film projector be governed by the speed at which the sound record is reproduced.

Sound reproductions from disc records are subject to slight variations in speed, due to the greater retardation effect of the needle at the outer edge of the disk, and due to variations in the length of the sound track as a function of amplitude and pitch of the sound wave. These variations, while unnoticeable in the unaccompanied playback of a sound record, are, nevertheless, of sufficient magnitude to necessitate the use of some sort of velocity correction as applied to the film projector.

According to one adaptation of my invention the record to be used is a phonograph disk record for sound reproduction, while the picture to be shown is one which is capable of producing a kaleidoscopic picture when projected from a suitably made picture film with the aid of specially constructed optical projection means.

In my U. S. Patent No. 2,307,202, issued January 5, 1943, I disclosed a system and a method for projecting kaleidoscopic images on a screen, these images being varied continuously in accordance with a special formation of characters and figure representations on a translucent film. These kaleidoscopic pictures are symmetric because of the optical system which is used. They may be varied in configuration, and when the changing effects are projected on a screen in the same rhythm as that of a musical rendition, the combined effect has been found to be both novel and pleasing to an audience.

It is an object of the instant invention to provide a system for the photographic registering on film of a series of index marks created by a selected spectrum of any transcription, these indices to be obtained as a function of the amplitude peaks of the transcription and to be employed for the purpose of varying the speed of the film drive during playback.

It is another object of my invention to provide a system for synchronizing a picture record with a sound record wherein a preliminary step is to record on a given film certain index marks corresponding to selected amplitude peaks of a transcription, this film being developed and used as a measuring device for laying out the progressions of picture images which are ultimately to be transferred to a picture film by photographic means, thereby to produce a suitable picture accompaniment for the sound transcription when both are played simultaneously.

It is a still further object of my invention to provide a novel system for maintaining a sound record and a picture record in synchronism.

The objects and advantages of my invention will be best appreciated after reaching an understanding of the detailed description which is to follow. In this description reference will be made to the accompanying drawings, in which Figure 1 shows diagrammatically the combination of elements which I preferably use for carrying out the invention;

Fig. 2 shows in a fragmentary circuit diagram an alternative embodiment which may be substituted for certain parts of the structure of Fig. 1; and Fig. 3 shows a strip of kaleidoscopic film record in relation to a graphic representation of impulses derived from a sound transcription.

Referring first to Fig. 1, I show therein a turntable I supporting a disk record 2 over which is the pick-up arm 3 for reproducing a sound record. A suitable amplifier 4 is used to deliver the electrical sound impulses to a loud speaker 5. In shunt with the loud speaker circuit is a filter 6 the input circuit of which may, if desired, be inclusive of a suitable impedance r.

The filter 6 is one which preferably possesses low tunable band-pass characteristics, in the low frequency range of the audible spectrum. This filter, therefore, passes only such wave peaks from the sound record as are of relatively slow recurrence. The impulses which constitute output currents from the filter 6 are then impressed upon a limiter device 7 the characteristic of which is such that its output consists of a square wave representing the selected spectrum of frequencies which existed in the sound transcription. If certain of the peaks of this wave are of longer duration than is desired they may be chopped into brief intermittent impulses as by means of a chopper or interrupter 8 of well known type.

There are two alternative paths provided for the output circuit from the chopper 8. Accordingly, I employ a double-pole double-throw switch 9 the switch blade terminals of which are connected to the output leads from the chopper. One of these leads is grounded. The upper terminals of the switch 9 are used for making the measuring film herein shown as a sensitized index film 10. The film is moved at a constant speed past a gate 11 which is exposed to a light source 12. This light source is in circuit with the output from the chopper 8 when the switch blades are moved to the upper position. An energy source 13 is shown for lighting the lamp 12 under control of the chopper 8.

In accordance with the arrangement of Fig. 1 thus far described, it will be observed that the disk record 2 may be played while moving the sensitized index film 10 at a continuous rate, thus obtaining light flashes from the lamp 12 which are recorded on the index film. The orifice in the film gate 11 is preferably disposed so as to record a row of dots along the edge of the index film 10. When this index film is developed certain characteristics of a musical rendition will appear as rhythmic impulses corresponding to a sonic cross-section of the recording. These impulses can be interpreted by those skilled in the art so as to permit of laying out a suitable train of picture images for purposes of kaleidoscopic reproduction. These images will preferably by be varied in accordance with the imagination of the artist who attempts to interpret the music by his kaleidoscopic representations. The rhythm of the music is thereby made the theme for the variations in kaleidoscope configuration and color.

The next step in my process is one wherein the kaleidoscopic or other material is photographed on a strip of film. Before developing this second film it is finally printed from the index film 10 so as to bear the same rhythmic index dots which were obtained from the original playback of the record 2. The picture record with its index dots along the margin is then developed and used for projection purposes. At this time the switch 9 is thrown into the lower position so as to communicate the chopped indexing impulses from the playback of the sound record to a governor device for controlling the speed of the picture film projector motor 14. The picture film 15 is shown supported by a winding drum 16 and an unwinding drum 17. The film passes through a gate 18 in association with which is an optical system illuminated by the lamp 19 for projecting a picture on the screen 20. The film also passes through another gate 21 across the aperture of which the index spots of the film are moved. This gate is illuminated by a light source 22 and has a small opening through which light may pass and be projected upon a photocell 23. This photocell responds to the impulses as shown on the index spot track and these impulses are delivered to an amplifier 24. The amplified impulses are then fed to a primary winding 25 of a transformer 26. This transformer has an opposed primary winding 27 which is connected to one of the lower terminals of the switch 9 so as to receive impulses from the playback of the sound record 2. The source 13 supplies operating potentials to either of the transformer coils 25 and 27 according to the conductivity of the respective amplifier stages in the chopper 8 and in the amplifier 24.

If the record disk 2 and the picture film 15 are started at corresponding points they can be maintained in synchronism in the following manner:

The impulses derived from the chopper 8 will traverse the primary winding 27. Corresponding impulses will be derived from the recorded dots on the film 15 which are sensed by the photocell 23 and fed to the amplifier 24. The output circuit of this amplifier includes the primary winding 25 of the transformer 26. If these impulses are simultaneous they will neutralize one another, since the windings 25 and 27 are in opposition and both are fed from the source 13 when switch 9 is in the downward position.

However, if the phonograph disk 2 runs ahead, it will be necessary to accelerate the motor 14 for the film projector. Acceleration is accomplished in the following manner:

Transformer 26 has a secondary winding 28 one end of which is grounded, while the other end connects with the control grid of a vacuum discharge tube 29. The input circuit for this tube includes a grid biasing source 30. The output circuit includes a source 31 the positive terminal of which connects through the winding of a relay 32 to the anode of the discharge tube 29. Relay 32 is preferably of the slow-acting type. It possesses two armatures 33 and 34. Armature 34 when in the back position short-circuits a resistor 35, which resistor is in series with a resistor 36 and in circuit with the shunt field 37 of the film projector motor 14.

The impulse which is derived from the chopper 8 is transformed and fed to the grid of tube 29, thus rendering this tube conductive. Relay 32 pulls up and opens the shorting circuit through its armature 34. The added resistance 35 in the shunt field circuit causes motor 14 to accelerate, thus restoring synchronism between the turn table and the film projector. This acceleration will take place momentarily each time an impulse from the chopper precedes a corresponding impulse from the amplifier 24. When these impulses from the amplifier 24 are concurrent with the impulses from the chopper 8 they have the effect of restoring the cut-off bias on the tube 29, thus terminating the acceleration effect which was first applied.

Assume now that the film projector is running ahead and its motor 14 needs to be retarded. In this case the impulses from the amplifier 24 will precede corresponding impulses from the chopper 8. The impulse impressed on the primary winding 25 of the transformer 26 will be induced in the secondary winding 38 and fed to the grid of a gas-filled tube 39, causing ignition of this tube. In the output circuit of the tube 39 is a relay 40 and also in circuit therewith the armature 33 of relay 32. The back contact for armature 33 is connected to the positive terminal of the source 31. The cathodes of both tubes 29 and 39 are connected to the negative terminal of this source. When the gas-filled tube 39 becomes ionized, current flows through the winding of relay 40 and causes its armature 41 to pull up. This action short-circuits resistor 36, and, until relay 32 is pulled up by the subsequent output of an impulse from the chopper 8, both resistors 35 and 36 are momentarily short-circuited. The increased current in the field winding 37 of the motor 14 produces a retardation action on this motor, as is desired. The effect of the retarding action, however, is terminated by the action of relay 32 which opens the circuit from the source 31 through the relay 40 to the anode of the gas-filled tube 39. Tube 39 is, therefore, extinguished and the armature 41 of relay 40 is restored to its open-circuit position. The front contact of armature 33 is connected to ground in order that the process of extinguishing the discharge in the gas-filled tube 39 may be assured.

Referring now to Fig. 2, I show a modification in which the acceleration or retardation of the projector motor may be accomplished by means of an electro-magnetic brake. The primary windings of the transformer 26 will be understood to be connected to the same apparatus as shown in Fig. 1. That is to say, the primary winding 27 is fed from the chopper 8. The primary winding 25, however, is fed from the amplifier 24 under control of impulses derived from the photocell 23. In this case the secondary winding 28 is connected at one terminal to the cathode of a vacuum discharge tube 42. The other terminal of the secondary winding 28 is coupled through a capacitor 43 to the control grid of tube 42. This grid is self-biased by means of a resistor 44 through which it is connected to the cathode.

The gas-filled discharge tube 39 is arranged with its control grid in circuit with the secondary winding 38, the biasing source 30, and a resistor 53 which is connected to the cathode. The anodes of the two tubes 39 and 42 are connected respectively to terminals of two interconnected windings 45 and 45a on a magnet, the poles 47 of which are arranged to produce lines of magnetic force through a rotatable disk of conductive material 46. This disk is mounted on the shaft of the projector motor 14. As is well known, the rotation of a disk 46 in the field of a magnet produces eddy currents therein which have a braking action.

The source 31 has its positive terminal connected to the junction point of the windings 45 and 45a. Winding 45 has only a few turns and is in circuit with the anode of the vacuum tube 42. A greater number of turns of the winding 45a is in circuit with the anode of the gas-filled tube 39.

Normally the vacuum tube 42 conducts current, thus energizing the left hand portion of the winding 45 and causing a slight braking action on the rotatable disk 46.

In response to the impress of impulses on the transformer windings 27 and 28 the vacuum discharge tube 42 is momentarily blocked. When the magnetic coil 45 de-energizes the magnetic flux across the poles 47 is reduced substantially to a zero value because no current flows through the winding 45a at this time. This permits acceleration of the motor 14. When the impulse derived from the chopper 8 terminates, then the vacuum tube 42 again becomes conductive and the normal degree of magnetic flux across the magnetic poles 47 is restored.

Assume now that the projector motor 14 is driving the projector too fast and needs to be retarded. In that case the impulses derived from the action of the photocell 23 and the amplifier 24 are such as to produce a positive charge on the grid of the gas-filled tube 39, thus producing an ionization discharge in the tube. The subsequent current flow through the magnet coil 45a will then be such as to increase the magnetic density through the metallic disk 46 with the result that the braking action will be increased.

In order to extinguish the gas-filled tube 39 I preferably provide a control action which depends upon the subsequent impress of an impulse across the transformer windings 27 and 28 such as to block the vacuum tube 42. This impulse is, of course, one of the series of impulses derived from the chopper 8. When the vacuum tube 42 is blocked the sudden stoppage of anode current results in the impress of an impulse across capacitor 48 which drives the cathode of the gas-filled tube 39 in a positive direction. Simultaneously the more negative potential applied to the cathode of the vacuum tube 42 is reflected in an impulse across the condenser 49 such as to drive the anode of the gas-filled tube 39 in a negative direction. The potential difference between the anode and the cathode of the tube 39 is, therefore, reduced to a value below that at which the ionization discharge can be sustained. This action is also aided by changes in the potential drop across the several resistors 50, 51 and 52, which are so disposed in the output circuits of the two tubes 39 and 42 as to allow appreciable time for the condensers 48 and 49 to charge and discharge.

Referring again to the condition which requires acceleration of the motor 14, the blocking action on the tube 42 has a further effect in preventing an immediate subsequent impulse on the control grid of the tube 39 from producing ionization in this tube. Due to a certain time lag in the charging of the condenser 48 the cathode of the tube 39 will momentarily be rendered quite positive. The duration of this positive charge on the gas-filled tube cathode can be arranged to extend over the range of times at which a delayed positive impulse from the amplifier 24 might be impressed upon the transformer windings 25 and 38. A potential drop will, therefore, exist in the resistor 53 such as to render the grid of the tube 39 more negatively biased than normally and the strength of the impulse derived from the transformer winding 38 would in this case be insufficient to overcome this negative bias and to ionize the tube 39. Furthermore, the tube 39 could not be ionized immediately following a blocked condition on the tube 42 for the reason that with a highly negative potential on the cathode of the tube 42 a surge impulse across the condenser 49 would lower the potential on the anode tube 39 to a point which would cause failure of this tube to ionize, as is desired.

Referring now to Fig. 3 which is generally self-explanatory, the operation of the above described method of synchronizing is well illustrated. At section O the two pulses arrive in synchronism. No corrective action takes place either to accelerate or to decelerate the motor 14. At section P the recorded pulse arrives first and the motor 14 is speeded up. At section Q the pulses again arrive in synchronism. At section R the film has been driven too fast and the photo-pulses arrive before the recorded pulses, thus requiring a braking action on the motor which is accomplished in the manner hereinbefore set forth. At section S the dots are again in synchronism and the motor runs at constant speed.

Various modifications of my invention will suggest themselves to those skilled in the art upon reviewing the foregoing specification. Such modifications, however, are to be understood as comprehended within the scope of the invention to the same extent as is permitted by the scope of the claims.

I claim:

1. In a system for maintaining synchronism between the speed of a sound record player and that of a film projector, means for deriving variably timed synchronizing impulses from a sound record, said impulses being representative of a definite range of the sound recorded on said record, a film having a record thereon of said impulses, independent motors for the player and the projector respectively, means including a photo-electric sensing device for deriving impulses from said film which have a time sequence corresponding to that of the first said impulses, and means operative when an impulse derived from the sound record is asynchronous with a corresponding impulse derived from the film for altering the speed of the film projector motor.

2. Apparatus for synchronizing a picture projection with a sound reproduction comprising a sound record, a record player, a motion picture film, a film projector, independent motors for driving the player and the projector respectively, means controlled by the sound record for producing intermittent impulses which are coordinated with a certain characteristic of the sound record itself, a record track on said film, said track bearing a series of indicia corresponding to said intermittent impulses, means controlled by said indicia for producing intermittent impulses which normally coincide with the first said impulses, and means operative in the event of phase displacement between corresponding impulses from the sound record and from the film for correcting the speed of the film projector motor.

3. Apparatus according to claim 2 in which the last said means includes a device for varying the impedance of at least one of the windings of the film projector motor.

4. Apparatus according to claim 2 in which the last said means includes a device for varying the load on the film projector motor.

5. Apparatus according to claim 2 in which the last said means includes a metallic disk rotatable by the film projector motor and a device for generating a magnetic field of variable intensity through said disk.

6. In a synchronizing system, two inter-related sources of irregularly timed impulses to be synchronized, a vacuum discharge tube responsive to impulses from one of said sources, a gaseous discharge tube responsive to impulses from the other of said sources said tubes being connected in a balanced relationship each to the other, independent motor driven devices for controlling the rates at which the impulses from the two respective sources are delivered, means controlled by the vacuum discharge tube for adjusting the speed of one of said devices in one sense and means controlled by the gaseous discharge tube for adjusting said speed in the opposite sense.

7. A system for governing the speed of a picture film projector motor under control of the independent speed of travel of a sound record past a pick-up point, comprising means for deriving a train of synchronizing impulses from the playing of said sound record, means for deriving a similar train of impulses from a picture film fed past a beam of light which impinges on a photo-electric cell in a film projector driven by said motor, a magnetic brake for variably retarding said motor, means for sensing the phase relation between corresponding impulses in the two trains, means for releasing said brake in response to the action of said phase sensing means when the impulses of the first said train are in leading relation to corresponding impulses of the second said train, and means for applying said brake more forcibly in response to the action of said phase sensing means when said phase relation is reversed.

8. An apparatus for recording irregularly recurring like indicia markings onto a light sensitive medium, the spacing of said indicia markings bearing a relationship to the recurrence of a definite spectrum of frequencies which exist in a sound record, comprising means for converting said sound record into electrical signals representative thereof, means for deriving from said electrical signals pulses representative of the recurrence of a definite spectrum of frequencies, and means for recording marking indicia on said medium under the influence of said pulses.

9. Apparatus in accordance with claim 8, wherein the pulses derived from the electrical signals, and which are representative of the recurrence of a definite frequency spectrum in the sound record, are derived by passing the electrical signals through an electrical filter.

10. Apparatus in accordance with claim 8, wherein the pulses derived from the electrical signals, and which are representative of the recurrence of a definite frequency spectrum in the sound record, are derived by passing the electrical signals through an electrical frequency discriminating filter and an amplitude limiting apparatus.

11. Apparatus in accordance with claim 8, wherein the pulses derived from the electrical signals, and which are representative of the recurrence of a definite frequency spectrum in the sound record, are derived by passing the electrical signals through an electrical frequency discriminating filter and an amplitude limiting apparatus, a time limiting apparatus.

12. Apparatus in accordance with claim 8, wherein said recording medium is a light sensitive medium, and wherein the means for recording the marking indicia under the influence of the pulses comprises a light source having the illumination thereof controlled by said pulses and masking means positioned between said light source and said medium.

13. Apparatus in accordance with claim 1, wherein said film projector is a projection kaleidoscope.

14. A system for maintaining synchronism between a film projector and a related sound source comprising means for producing variably spaced like markings on the film in response to the occurrence of sound signals of a predetermined frequency in the related sound source, motor means for transporting the film through the projector, means for producing a first series of impulses from the film markings, means for producing a second series of impulses from the related sound source, means for comparing the time relationship of the two series of impulses, and means responsive to said last named means for controlling the speed of the motor means.

15. A system for maintaining synchronism between a film projector and the tempo of a related sound source comprising means for producing irregularly recurring like markings on the film in response to the occurrence of sound signals of a predetermined frequency in the related sound source, motor means for transporting the film through the projector, means for producing a first series of impulses from the film markings, means for producing a second series of impulses from the occurrence of sound signals of said predetermined frequency in the related sound source, means for comparing the time of occurrence of the two series of impulses to produce control potentials, and means responsive to the produced control potentials for controlling the speed of operation of the motor means.

16. The method of maintaining synchronism between a film projector and a related sound source, wherein the film has been provided with irregularly recurring like markings in accordance with the occurrence of sound signals of a predetermined frequency in the related sound source, which comprises the steps of transporting the film through the projector, producing a first series of impulses from the film markings as the film is transported through the projector, producing a second series of impulses from the occurrence of sound signals of the predetermined frequency in the related sound source, comparing the time relationship of the two series of impulses, and utilizing the time differences between the two series of impulses to control the rate of transportation of the film through the projector.

WILLIAM C. EDDY.